Aug. 2, 1927.

E. BOURKE 1,637,728

RIDDLE

Filed Sept. 4, 1923

Inventor:
Edmund Bourke
By John Q. Seifert
Atty.

Patented Aug. 2, 1927.

1,637,728

UNITED STATES PATENT OFFICE.

EDMUND BOURKE, OF FOOTSCRAY, NEAR MELBOURNE, VICTORIA, AUSTRALIA.

RIDDLE.

Application filed September 4, 1923, Serial No. 660,966, and in Australia June 3, 1922.

This invention relates to improvements in riddles, and more particularly to riddles employed in reaper-threshers, stripper harvesters and similar grain harvesting machinery, which riddles receive the threshed heads and function to separate the grain from chaff aided by an air blast.

Riddles of harvesting machinery being customarily of flat one-part construction, there is a tendency to loading or accumulation of the threshed heads on the riddle. This invariably causes loss of grain, and particularly so, when a heavy crop is being harvested, as the air blast under such circumstances cannot effectively remove the chaff and a quantity of the grain is carried over the tail-piece of the riddle and falls into the tailings chute to be again elevated to the threshing drum, while a further quantity of grain is blown away by the air blast. Under existing winnowing conditions, violent shaking motion is imparted to the riddles and a very strong blast is employed, thus causing undue wear of bearings and also resulting in loss of grain, especially when a light crop is being harvested or when thin patches of crop occur.

My invention has been devised to obviate the disadvantages hereinbefore enumerated, and its objects are achieved by the provision of a two-part stepped riddle. The riddle sections are adjustable relatively to each other in horizontal and vertical planes, and each of said riddle sections is capable of independent angular adjustment to suit crop conditions, while simple means are provided to lock the said riddle sections in selected adjustments.

Reference is had to the drawings, wherein:—

Figure 1:
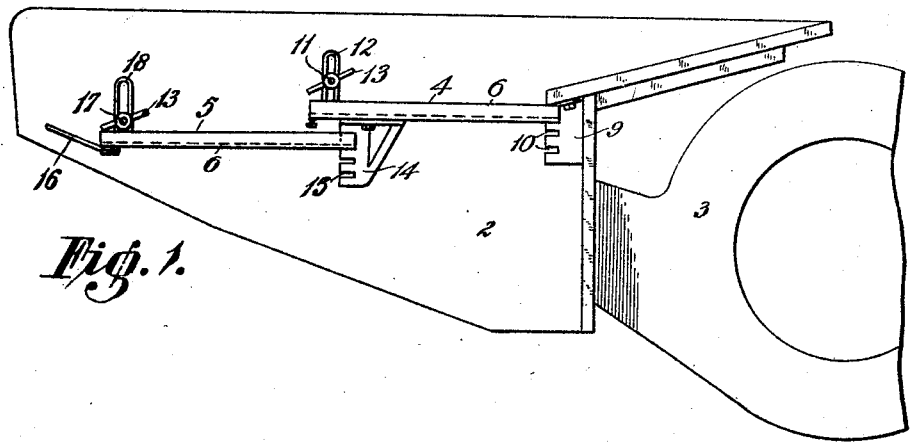
Figure 1 is a sectional elevation illustrating a winnower of a harvesting machine equipped with the improved riddle.
Figure 2:
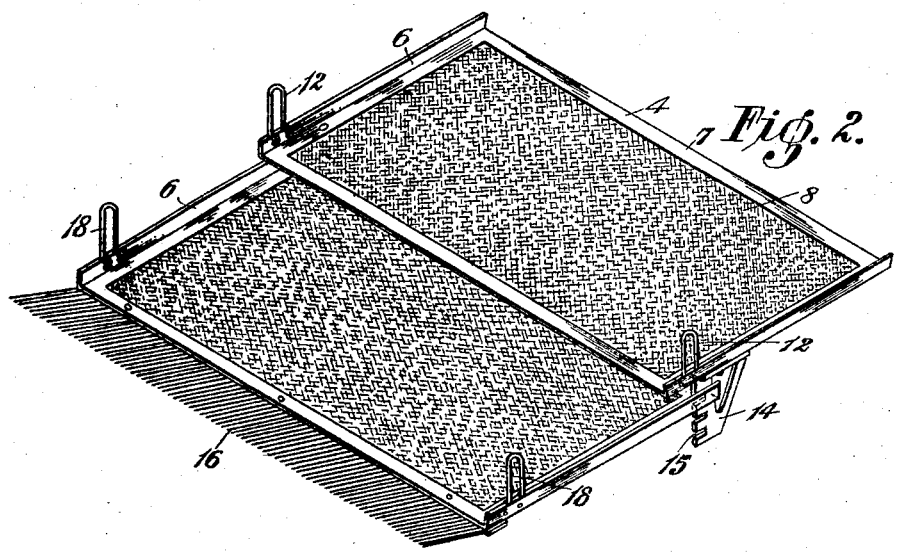
Figure 2 is a perspective view of the two-part stepped riddle.

2 is the winnower box of a grain harvesting machine, and 3 the fan casing from which an air blast is directed across the riddle mounted in said box.

The improved riddle comprises two overlapping riddle sections 4 and 5 in stepped arrangement. Each section comprises a rectangular frame having its side bars 6 preferably constructed of angle-section metal and its end bars 7 formed of flat metal, with perforated metal 8 or wire mesh rigidly fastened to said bars by rivets or other means.

The forward end of the upper riddle section 4 is supported by metal brackets 9 that are secured to the winnower box 2, and constructed as having a series of slots or notches 10 to accommodate the flat end bar 7 of said riddle section at a selected elevation.

The rear end of the said riddle section 4 is supported by bolts 11 that are passed through the walls of the winnower box 2 and through metal loops 12 affixed to and projecting upwardly from the side bars 6.

The flat bar and slot connection at the forward end of the riddle section provides a pivot, and the bolts 11 and loops 12 at the rear end enable said riddle section to be tilted, while wing-nuts 13 on said bolts serve to lock the riddle section in selected angular adjustment.

The lower riddle section 5 has its forward end disposed in advance of the rear end of the upper riddle section, and it is supported by metal brackets 14 that are bolted to the undersurfaces of the side bars 6 of said upper riddle section. Each of these brackets 14 has at its rear edge a series of slots or notches 15 to receive the flat end bar 7 of the lower riddle section and maintain the forward end thereof at a desired height relatively to said upper riddle section.

The rear end of the lower riddle section, which is furnished with a tail-piece or comb 16 common to riddle constructions, is supported by bolts 17 and loops 18 so as to be capable of being independently adjusted angularly and locked in a set position similarly to the upper riddle section.

In harvesting operations, the threshed heads descend upon the upper riddle section 4 to be winnowed and they are caused to pass onto the lower riddle section 5. The air blast from the fan chamber 3 is so directed that a strong current passes between the stepped riddle sections and catches the chaff in its fall and instantly blows it clear, while the grain passes to the lower riddle section and then through the perforations of the same.

Figure 3:
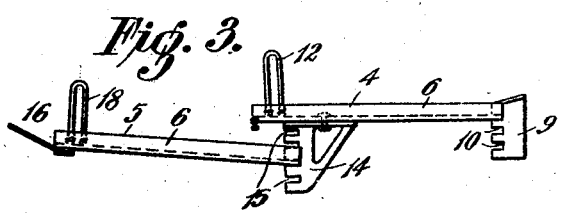
Figure 3 is a view in side elevation of the riddle illustrating the lower section tilted upwardly.

In average crops, the two riddle sections are preferably arranged in parallel planes, while in very light crops the rear end of the lower riddle section is tilted upwardly and locked in that position—see Figure 3, but it will be apparent that either one or both of the riddle sections may be adjusted angularly to a required degree and locked in selected position by the wing-nuts 13 to meet any crop conditions or winnowing requirements.

Having thus described my invention I claim:

In a riddle for threshing machines, a pair of screen sections, and means to adjustably support said screen sections in stepped relation one above and forward of the other comprising a pair of fixed brackets having superposed notches in either one of which notches an end of a screen section is adapted to be engaged and supported, brackets fixed adjacent to the opposite end of and extending downward from said screen section, said brackets being arranged with vertically disposed notches and in either one of which notches an end of the other screen section is adapted to be engaged and supported to arrange the screen sections in stepped relation one above and forward of the other, and means to separately support the screen sections at the opposite ends from a fixed part to have adjustment in a vertical direction and variably incline one screen section independently of the other.

EDMUND BOURKE.